(12) United States Patent
Powell et al.

(10) Patent No.: US 9,898,304 B2
(45) Date of Patent: *Feb. 20, 2018

(54) FAST BOOTING A COMPUTING DEVICE TO A SPECIALIZED EXPERIENCE

(71) Applicant: MICROSOFT TECHNOLOGY LICENSING, LLC, Redmond, WA (US)

(72) Inventors: Therron L. Powell, Bluffdale, UT (US); Jason Michael Anderson, Snoqualmie, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/852,486

(22) Filed: Sep. 11, 2015

(65) Prior Publication Data

US 2016/0004540 A1 Jan. 7, 2016

Related U.S. Application Data

(63) Continuation of application No. 12/878,721, filed on Sep. 9, 2010, now Pat. No. 9,146,760, which is a
(Continued)

(51) Int. Cl.
*G06F 9/44* (2006.01)
*G06F 9/455* (2018.01)

(52) U.S. Cl.
CPC ........ *G06F 9/4401* (2013.01); *G06F 9/45533* (2013.01); *G06F 9/4406* (2013.01)

(58) Field of Classification Search
CPC .. G06F 9/4401; G06F 9/4406; G06F 9/45533; G06F 9/4405; G06F 15/177
See application file for complete search history.

(56) References Cited

U.S. PATENT DOCUMENTS 5,136,711 A 8/1992 Hugard
5,345,590 A 9/1994 Ault
(Continued)

OTHER PUBLICATIONS

Ricciuti, "Microsoft 'hypervisor' plan takes shape", News.com, Jun. 7, 2005.
(Continued)

*Primary Examiner* — Fahmida Rahman
(74) *Attorney, Agent, or Firm* — L. Alan Collins; Collins & Collins Intellectual, LLC

(57) ABSTRACT

Described is a technology by which independent computing functions such as corresponding to separate operating systems may be partitioned into coexisting partitions. A virtual machine manager, or hypervisor, manages the input and output of each partition to operate computer system hardware. One partition may correspond to a special purpose operating system that quickly boots, such as to provide appliance-like behavior, while another partition may correspond to a general purpose operating system that may load while the special purpose operating system is already running. The computer system that contains the partitions may transition functionality and devices from one operating system to the other. The virtual machine manager controls which computer hardware devices are capable of being utilized by which partition at any given time, and may also facilitate inter-partition communication.

17 Claims, 10 Drawing Sheets

Related U.S. Application Data continuation of application No. 11/377,747, filed on Mar. 16, 2006, now Pat. No. 7,814,307.

(56) References Cited

U.S. PATENT DOCUMENTS

| | | | |
|---|---|---|---|
| 5,784,702 A | 7/1998 | Greenstein | |
| 6,279,046 B1 | 8/2001 | Armstrong | |
| 6,438,671 B1 | 8/2002 | Doing | |
| 6,681,240 B1 | 1/2004 | Armstrong | |
| 6,763,458 B1 | 7/2004 | Watanabe et al. | |
| 6,877,158 B1 | 4/2005 | Arndt | |
| 6,892,383 B1 | 5/2005 | Arndt | |
| 6,996,828 B1* | 2/2006 | Kimura | G06F 9/45537 718/102 |
| 7,024,549 B1 | 4/2006 | Luu et al. | |
| 7,343,484 B2 | 3/2008 | Du et al. | |
| 7,356,677 B1 | 4/2008 | Rafizadeh | |
| 7,424,601 B2 | 9/2008 | Xu | |
| 7,555,642 B2 | 6/2009 | Gagneraud | |
| 7,607,003 B2 | 10/2009 | Tseng | |
| 7,607,033 B2 | 10/2009 | Diab | |
| 7,822,962 B2* | 10/2010 | Lam | G06F 9/441 713/2 |
| 8,095,783 B2* | 1/2012 | Chong | G06F 9/4406 713/2 |
| 2004/0111552 A1 | 6/2004 | Arimilli | |
| 2004/0205755 A1 | 10/2004 | Lescouet et al. | |
| 2004/0225876 A1* | 11/2004 | Lam | G06F 9/441 713/2 |
| 2004/0226020 A1 | 11/2004 | Birmingham | |
| 2005/0091029 A1 | 4/2005 | Traut | |
| 2005/0091476 A1 | 4/2005 | Doing | |
| 2005/0251806 A1 | 11/2005 | Auslander et al. | |
| 2006/0070032 A1 | 3/2006 | Bramley et al. | |
| 2006/0070066 A1 | 3/2006 | Grobman | |
| 2006/0130060 A1 | 6/2006 | Anderson et al. | |
| 2006/0146057 A1* | 7/2006 | Blythe | G06F 9/45537 345/506 |
| 2007/0005946 A1 | 1/2007 | Zimmer | |
| 2007/0204165 A1* | 8/2007 | Lytle | G06F 21/64 713/176 |

OTHER PUBLICATIONS

XenSource, "XenSource to Support Intel® Virtualization Technology in Xen Hypervisor", Mar. 1, 2005.
Norvell, "Mac OS X Client General Security Practices, Dual Booting and the Classic Environment", Aug. 8, 2003.
Wagner, "Fast-boot Linux", Wagner's Weblog, Jan. 15, 2004.
U.S. Appl. No. 11/377,747, filed Mar. 16, 2006, Powell.
U.S. Appl. No. 12/878,721, filed Sep. 9, 2010, Powell.

* cited by examiner

FAST BOOTING A COMPUTING DEVICE TO A SPECIALIZED EXPERIENCE

RELATED APPLICATION(S)

This Application is a Continuation of and claims benefit from U.S. patent. application Ser. No. 12/878,721 (U.S. Pat. No. 9,146,760) that was filed Sep. 9, 2010, (issued Sep. 9, 2015) and that is a Continuation of U.S. patent application Ser. No. 11/377,747 (U.S. Pat. No. 7,814,307) filed Mar. 16, 2006, (issued Oct. 12, 2010) each of which is incorporated herein by reference in its entirety.

BACKGROUND

As many computer systems are evolving towards providing entertainment, particularly in mobile and home computer systems, there is an increased need to have computing devices take on attributes more like consumer electronics devices. While originally it was generally nice to have a computer system that can also function similarly to a consumer electronics device such as a DVD player, such similar behavior is becoming standard or a requirement in order to sell computing products in the competitive computer and consumer electronics marketplace. One example requirement is a quick power-on experience. Another example requirement is extending some elements of autonomy, reliability or protection, e.g., a user's game playing should not degrade or crash the appliance-like features of digital video recording.

In conflict with these specialized requirements, to have practical value, a general purpose operating system cannot be very limited. For example, Microsoft Windows® is a platform designed for open and flexible implementations, enabling computer manufacturers, software developers and even users to adapt and implement personal computers in various different usage models, without requiring a specialized operating system for each model. Microsoft Windows® is therefore a very elaborate platform that accommodates a very broad base of capabilities, even though specialized solutions often only use a small fraction of the general-purpose Windows® platform resources that are available. While this platform extensibility is highly valuable in that it ensures flexibility and reduces development overhead, it does require that the platform initialize hardware and prepare to accommodate this very broad base of capabilities, and that many system resources of the operating system be loaded upon boot or be part of the footprint.

Booting a robust (or comprehensive) general purpose operating system can be time consuming, generally taking between fifteen and thirty seconds. This boot delay may be considered acceptable in typical computing environments, but for single-purpose device usage, or consumer electronics feature parity, this delay is unacceptable to customers. Moreover, running everything through a general purpose operating system means that one service or component can crash the system, adversely impacting another service, subsystem or user's usage.

SUMMARY

Briefly, various aspects of the present invention are directed towards a technology by which independent computing functions, such as corresponding to separate operating systems, may be isolated into coexisting partitions. For example, one partition may correspond to a special purpose limited capability operating system that quickly boots, such as to provide appliance-like behavior in a computer system, while another partition may correspond to a general purpose operating system that may load while the special purpose operating system is already running. Once at least two operating systems are loaded, the computer system that contains the partitions may transition from one operating system to the other, such as automatically when the slower-loading operating system is fully loaded, or when a transition is requested by a user.

A virtual machine manager, or hypervisor, manages the input and output of each partition to operate computer system hardware. The virtual machine manager controls which computer hardware devices are capable of being utilized by which partition at any given time, and may also facilitate inter-partition communication.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
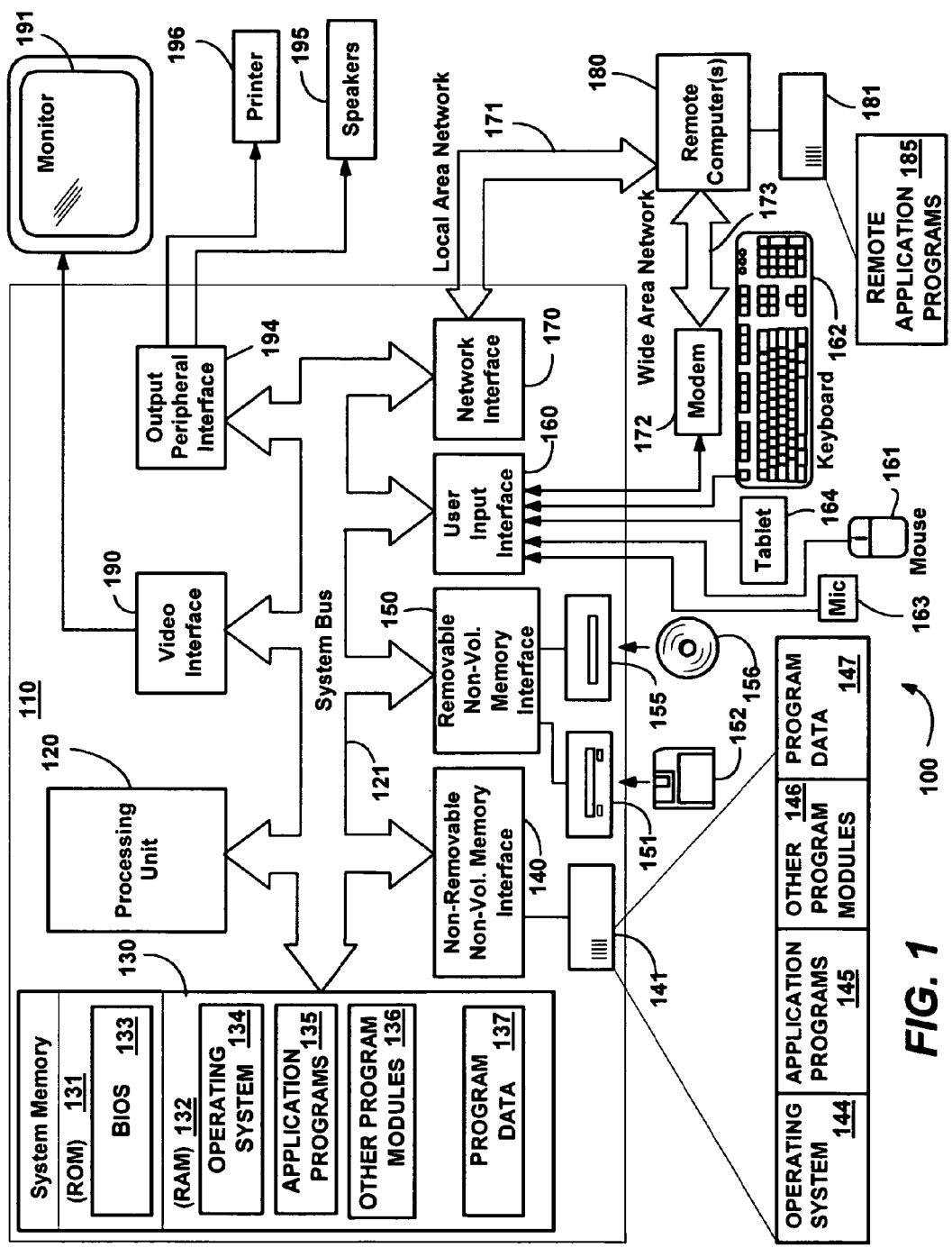
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in RON 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Fast Booting a Computing Device to a Specialized Experience

Various aspects of the technology described herein are directed towards a system that quickly boots a computing device to a limited scope or isolated experience. For example, a computing system can act as a media player without needing to fully initialize the many broader dimensions of a general purpose operating system, which, for example, may further or later load in the background for subsequent fast switching or concurrent usage of the computing device under a general purpose operating system. Notwithstanding, booting to other limited experiences (beyond media playing) is feasible, and also the general purpose operating system need not fully load in the background to provide additional functionality. Still further, booting into a partition in a manner that protects one experience from being interfered with by another is described herein, and provides substantial value. As such, any of the examples mentioned herein are non-limiting, and the present invention may be used various ways that provide benefits and advantages in computing in general.

Some solutions for instant media playing have engendered personal computers with multiple and specialty operating system images, and the user invokes the most appropriate operating system for the situation. Though dual and multi-boot capabilities may allow a system owner to select which operating system image and application set to load, current personal computers do not well support concurrent operations of these operating systems. For example, to switch from one operating system to another generally requires a termination and re-initialization and reboot into that other operating system.

The fast boot technology described herein is generally directed towards the concept of booting a streamlined-version of an operating system for a limited-purpose usage, such as watching a DVD movie. The technology further provides for the system to define or construct incremental partitioned resource space(s) which can then also allow for the additional concurrent loading of one or more other specialty or full general purpose operating systems in other partitions, such as when more elaborate capabilities of a full operating system are desired. These capabilities now can run with higher autonomy and enjoy more individualized experiences, when desired; (note that concurrent operating system executives on existing generation computer systems used to require expensive platform virtualization technologies). To this end, emerging computing device CPU capabilities, combined with a less common technology referred to as "hypervisor," provide such controlled, partition-based booting to be made more generally viable and available to the marketplace.

Figure 2A:
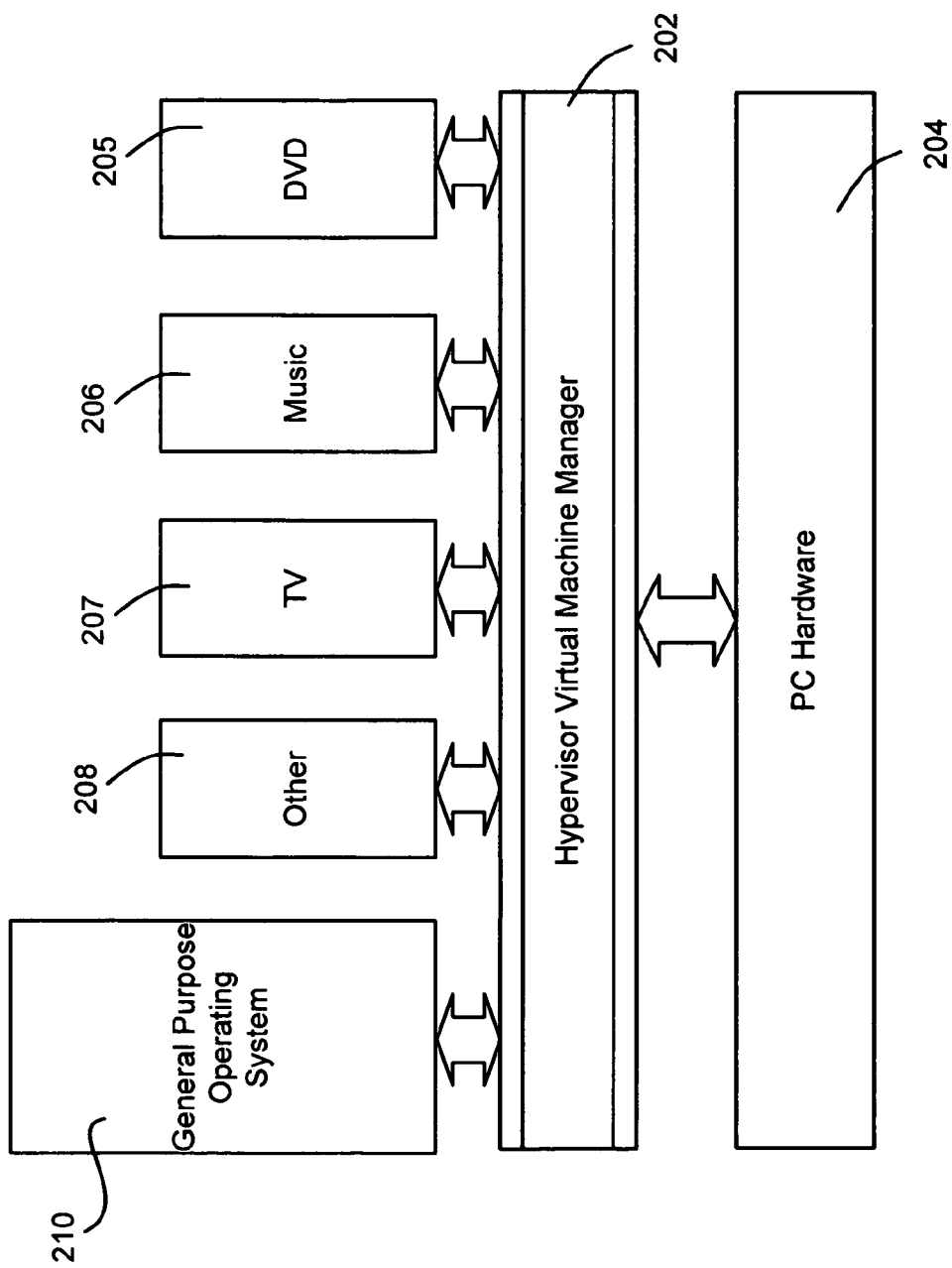
FIG. 2A is a block diagram representing an example architecture for fast booting to a specialized experience.

As represented in FIG. 2A, when facilitated via a hypervisor or virtual machine manager 202, two or more operating systems can run concurrently on computer hardware 204. The virtual machine manager 202 essentially comprises code that acts as a higher-privileged monitor to mitigate issues between operating systems running on virtualized machines. Note that newer (e.g., particularly x86-type) processors are emerging that assist the concept of having a higher privilege context than ring 0 (in which each kernel runs) to allow for an arbiter or virtual machine monitor or virtual machine manager; (further note that as used herein, virtual machine monitor and virtual machine manager, as well as VMM, can be considered equivalent). For example, among other operations, the virtual machine manager 202 tracks which operating system (partition) is to be notified of or passed a particular hardware interrupt event. In this manner, an operating system may run on a virtualized hardware platform behaving in its otherwise normal manner, even though the operating system may not directly "own" the real hardware directly; instead the virtual machine manager 202 essentially regulates and enforces the various partitions' shared utilization or ownership of devices.

By way of example, as represented in FIG. 2A, relatively thin, streamlined operating systems 205-208 may be dedicated to special purposes, such as DVD playing, music playing, television playing, and other purposes. Note that a general purpose operating system 210 is also available in FIG. 2A, e.g., a Microsoft® Windows®-based operating system such as Windows® Media Center Edition (which is designed to work with media-related devices, but despite its name is a full, general purpose operating system).

Figure 2B:
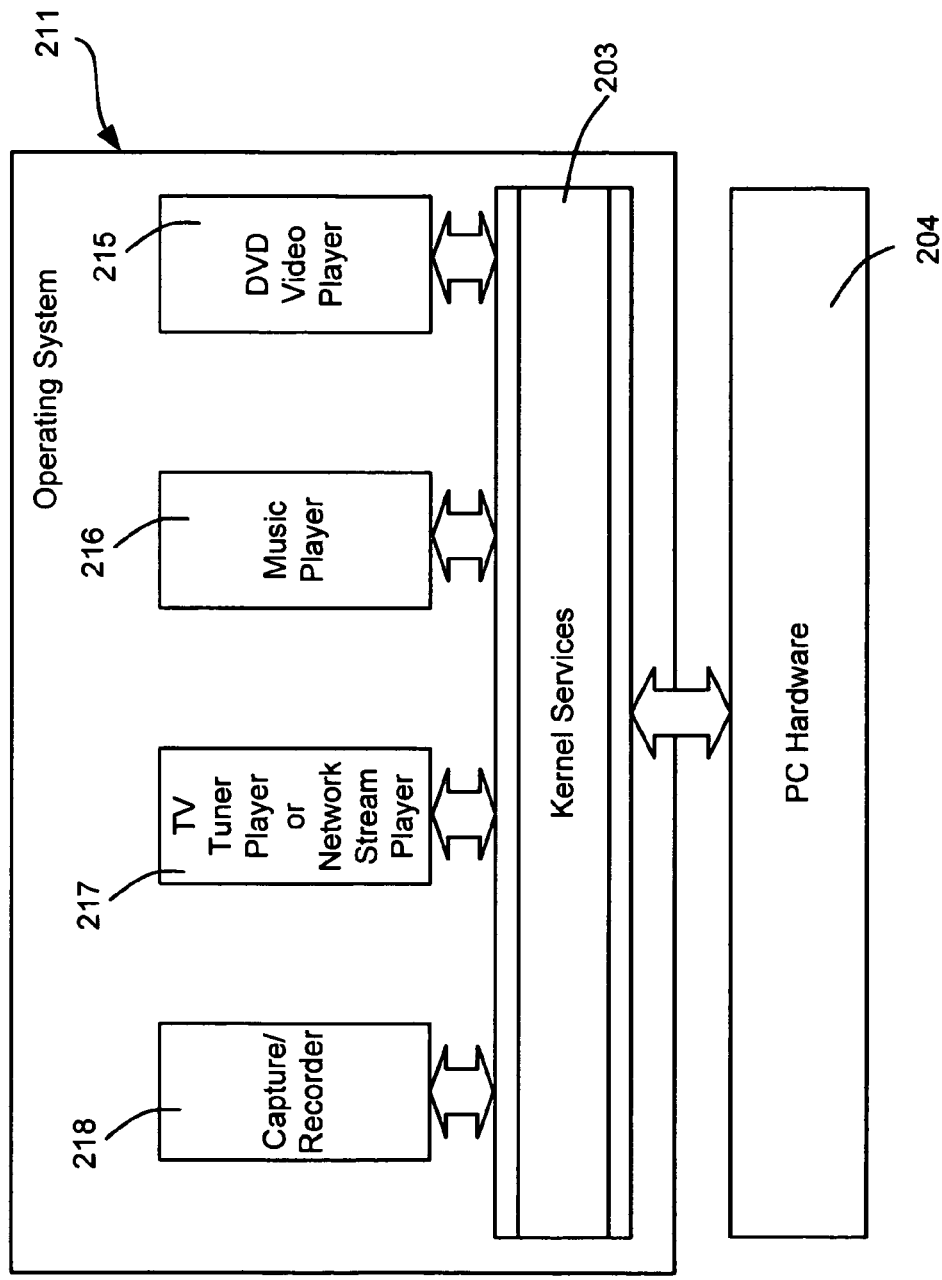
FIG. 2B is a block diagram representing an alternative example architecture for fast booting to a specialized experience and sharing resources to a consuming partition.

Alternatively represented in FIG. 2B is a functionally-rich platform as provisioned by a general purpose operating system 211 whose kernel services 203 support other applications 215-218 that may coexist, e.g., for audio/video recording and playing within the single operating system. If the operating service employs a more dynamic binding of device resources as needed with their device drivers, the operating system may boot more quickly and support only initially a smaller subset of application capabilities. However performance would be lessened, and other risks would exist by loading and linking other devices as they are later needed. Thus, one or more of these other application subsystems 215-218 may be fast booted.

As a result of booting to a streamlined special-purpose operating system such as the DVD operating system 205, the user may experience watching a first-initiated movie much quicker (relative to a full general purpose operating system boot), for example, while the rich platform 210 is being prepared for utilization. The streamlined, special-purpose operating system 205 provides a very quick boot (approximately five to seven seconds if from hard disk, or even less if from flash memory hardware or the like) to an experience desired by the user. For example, first activation through a media control button (e.g. play, fast forward, and so forth) or a special media-player button may be used to start the machine in a media player mode, or a given machine may by default or be user-configured to boot to the special purpose limited experience, such as on media insertion hardware events. For example, in order for the boot loader to determine whether to first load a virtual machine manager and/or a special purposes operating system, or directly load the full general purpose operating system, a specific button dedicated to the desired boot experience can be wired such that when pressed, the button generates a general purpose event to start the system, and subsequently stores a value in the BIOS which can then be used to pass to the BootLoader code. The hypervisor or virtual machine manager may be installed with one of the operating systems, distributed as part of the hardware platform within firmware or a special disk partition with the system, or even launched off temporary media like a DVD movie. The system may boot or even run the limited media image out of non-volatile memory image.

The specialty partition may be loaded with the hypervisor or a simpler launch of the operating system with the hypervisor loaded at a later time where it may define a partition that describes the pre-existent operating system and hoist it to run then on the virtual machine manager within the newly defined virtual machine context or partition that describes the pre-existent operating system. The virtual machine manager may then define other partitions as needed and launch within them other operating systems in new virtual machine contexts.

While the user is in the limited experience, a full copy of the general purpose operating system 210 (e.g., a Windows®-based operating system) can provisionally be loaded in the background to enable full personal computer functionality as well. Thus, after some relatively longer amount of time, e.g., on the order of less than a minute, the user can be enjoying the media experience and thereafter utilize the general purpose operating system concurrently, or even switch to it completely if the user desires to use the general purpose operating system exclusively. The experience may be generally seamless in that unless the user does something such as manually switch to a new application, switch to a windowing environment, and/or request or access other services, the user may not even realize that the general purpose operating system is available. For example, the user is not required to stop watching a movie while waiting for the complete general purpose operating system 210 to load. In contrast, conventional non-virtualized computer systems would require that the special purpose operating system 205 be terminated in order for a different general purpose operating system 210 to be launched.

Thus, in the foregoing example, the user can quickly boot to a specialized media partition for DVD, CD-ROM or removable flash media playing, while in background the general purpose operating system loads. A special button, or upon a media insertion event from a cold restart, enters the specialized mode.

It should be noted that a specialty operating system need not activate, monitor and/or serve the entire profile of available system hardware resources. The non-utilization or quiescence of one or more hardware resources that are not needed for a currently-active specialized user experience (or set of experiences) can reduce the power demand that these resources might otherwise require and thereby achieve a significant power savings. In one example estimate, for mobile systems this may yield on the order of ten to fifteen percent greater battery life for a movie playback experience, for example, if general computing activities are not needed at the same time. Essentially any component, including the components described herein such as the hypervisor, can be configured to control the power state of hardware resources based on the user experience or experiences that are currently active.

It also should be noted that when there is a separate partition for media, some special consideration can be given to digital rights management. This can offer powerful risk management business value to content owners. The partition itself may include or otherwise be associated with an autonomous digital rights management functionality, but may also leverage or extend the digital rights management capabilities and structure of the full operating system once it is loaded. For example, it is feasible that part of protected content such as first couple minutes of a DVD would not require digital rights management, however the rest would, whereby the specialized partition need not require as complex of a trusted digital rights management path, but the remainder would require a transition to the full general purpose operating system so that the trusted path was available.

However, having the partition itself include or otherwise be associated with digital rights management functionality provides an autonomous, hardened, and protected environment that also provides benefits. Partitioning may be used to fully isolate keys, cryptographic engines, codecs and media processing services into a controlled specialty partition. Isolating premium content and protecting it from applications and device drivers which might be loadable in a more open general purpose environment. For example, hardening a scoped, specialized operating system can be simpler and more robust than a general purpose operating system where other drivers and applications can be loaded. By virtue of isolation from open APIs or application platforms, a media partition can offer a more simplified, potentially measurable and secure environment for content owners, giving greater confidence that the media cannot be easily compromised. Also, a parent may let one or more children watch a movie on the special media or guest partition, which is isolated from accessing file system data. This protects the machine data by keeping the data in a locked environment until specifically unlocked.

To utilize two or more concurrently running operating systems, special provisions are made for Device I/O. At present, conventional devices and device drivers do not support directly sharing concurrently by multiple operating systems. Essentially only one unmodified OS, device driver 311 and or virtual machine manager can own a particular device. That owning virtual machine or the virtual machine manager may implement additional logic 312 (FIG. 3 here shown as a separate entity. An alternative model is a new physical device driver that also has the incremental capability) to share the device through virtualization or emulation to the other virtual machines (consumers 313 and 314).

For rich media experiences there are some particularly demanding requirements on the virtualization platform and its devices. A general paradigm for legacy device accommodation is to intercept device interactions by an operating system monitor, VMM or hypervisor to evaluate how those events should be managed when multiple operating systems may be contending for resource and functionality. This requirement for intervening logic may challenge assumptions for I/O timing. This is substantially exacerbated in that intervening logic may need to execute in a different context. Other modern technologies still have substantial latency for performing a context switch. However, for example, the human ear is very sensitive to slight changes in signal timing, and as a result audio devices are at high risk of aberrations or glitches if a platform is virtualized underneath operating systems, device drivers and applications that are not designed for a virtualized system.

To further illustrate such demands, a hardware interrupt may require a trap to the operating system monitor or hypervisor to evaluate the event and distinguish which virtual machine environment should service the interrupt. That virtual machine may implement a sharing provider which manages the I/O needs of other consuming guest partitions and multiplexes them through the physical device. The interrupt that came from the device may be reflected to the appropriate virtual machines that have implications on the resource to indicate I/O appropriate for that consuming guest.

An alternative approach is to provide a very specialized hypervisor that only needs to support a single specialty partition with limited explicit functionality. If the specialty partition only needs access to a small number of specific or select devices these devices may be owned by hypervisor, or the hypervisor is programmed to direct the I/O for the device to the specialty partition. The majority of the devices though may be owned by the general purpose OS. The device driver in the specialty partition for the select device under this approach would not be the same as a device driver that owned the hardware outright and must be aware of its relationship and dependency on the hypervisor or VMM. The specialty partition may still also virtualize its devices through a similar provider approach to the consuming general purpose guest operating system and its virtual device consumers. The hypervisor can help facilitate device I/O, interrupts, DMA and configuration management events.

Figure 4:
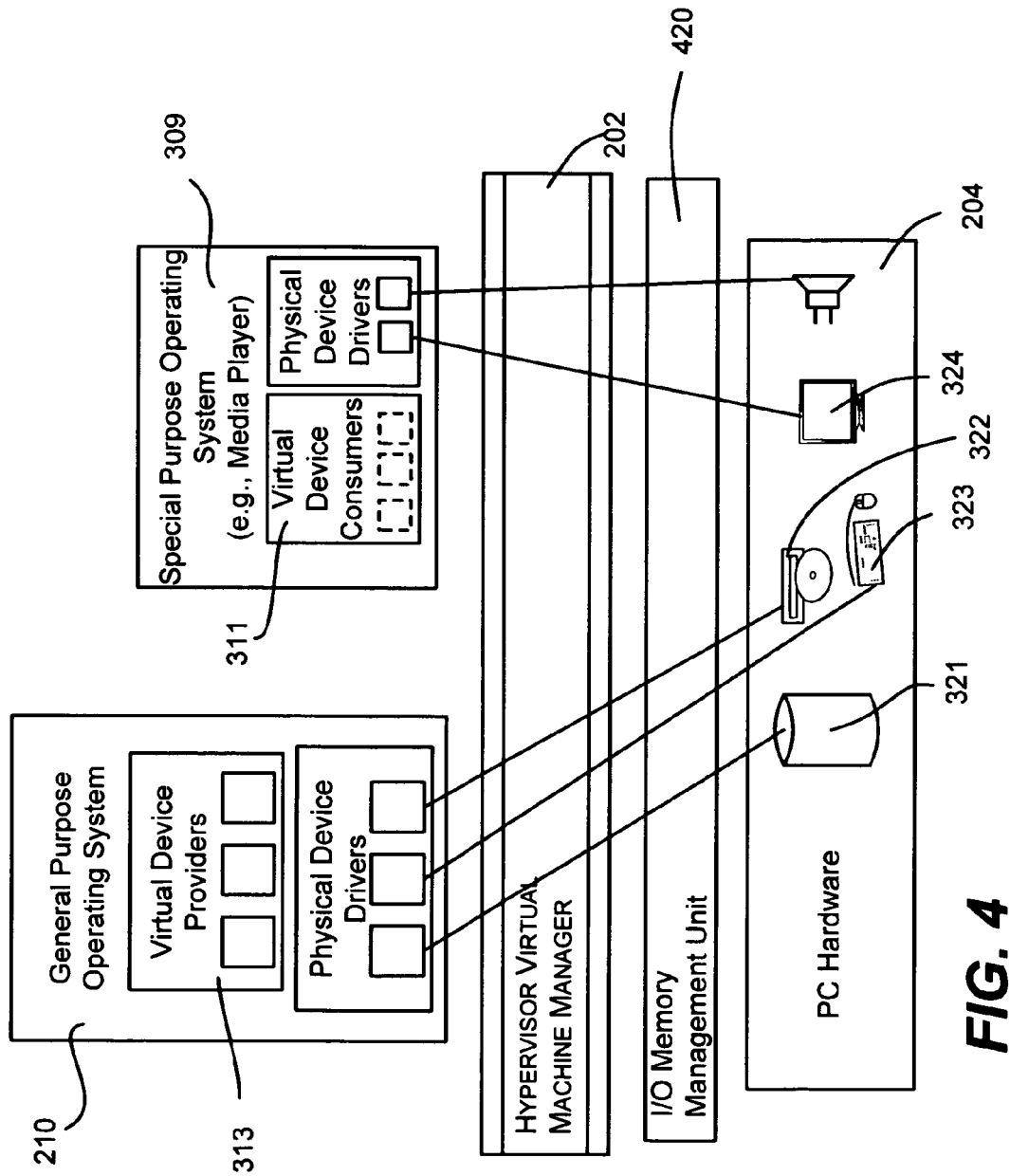
FIG. 4 is a block diagram representing devices having direct assignments to different partitions.

An alternative approach effects direct device assignments individually to different partitions, as generally depicted in FIG. 4. This approach may take advantage of a DMA remapping controller in the I/O bus hierarchy to ensure that device memory writes or DMA are redirected to the correct memory location for the appropriate guest. For example, an I/O memory management unit (IOMMU) 420 may be controlled (e.g., programmed) by the hypervisor 202 to understand the I/O and system management space of each guest partition and to be able to remap memory addresses based upon the device, guest partition and the memory address to which it is programmed to write. This approach may provide a suitable design for timing sensitive content such as audio and video, as described above. For example, if Digital Rights management hardening is implemented, as also described above, the media playing applications in the general purpose operating system may serve as control interfaces that communicate with an actual player in the specialty partition.

Figure 3:
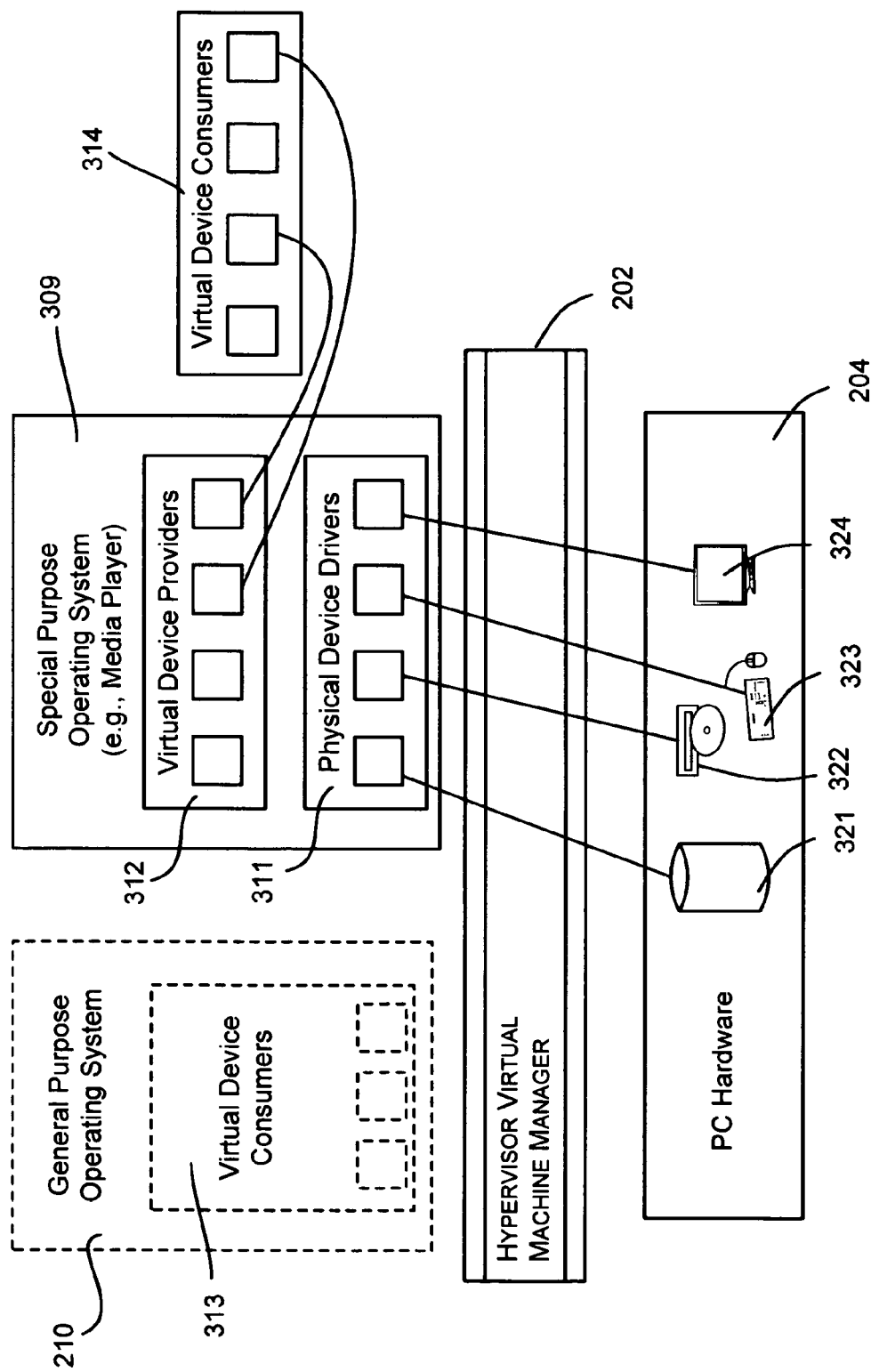
FIG. 3 is a block diagram representing various components with a special purpose operating system that provides a specialized experience.

To boot to a specialized partition, a partially isolated or fully independent facility may be provided, in which the partition/special purpose operating system essentially has its own device drivers. FIG. 3 shows such a system, in which real and at least a selective set of device drivers 311 allow the special purpose operating system direct access to a hard disk 321, removable media player 322, keyboard/mouse input 323 (there may be a separate driver for each) and a graphics display driver 324. Although depicted as present in FIG. 3, not all of the drivers shown need to exist in a given implementation, e.g., primary hard disk drivers having direct access to the hard drive 321 may not be necessary, e.g., if there is other non-volatile memory that can provide the fast or early boot image of the possibly small specialty partition. Note that many of a system's complement of devices need not be supported or controlled by the specialty partition with its reduced or specialized functionality. For example, as can be readily appreciated, relatively little UI is required for a media player, whereby a mouse or full keyboard may not be needed. Instead, sufficient user interface purposes may be provided by other input mechanisms, e.g., by special media control buttons (forward, reverse, stop, play and so forth), and/or by a wireless remote control device that is independent of a keyboard, mouse or touchpad. Note that until DMA remapping hardware becomes common in system chipsets, most devices will be owned and controlled in the general purpose OS or in the hypervisor itself.

The hypervisor and special purpose operating system (usually the first present operating system) may virtualize and share the physical resources such that they also may be utilized by subsequent concurrently loaded operating systems if it needs the same resource. Note that although first present, its loader may load the specialty operating system or application partition to a memory address above where a conventional operating system would load, to minimize the impact on legacy general purpose operating systems and their unaware drivers. For the current generation of devices which are not designed or intended to be shared, a first operating system and/or hypervisor will bind a device driver that works conventionally with the device, as represented in FIG. 3 by the drivers 311. On top of that device driver set 311, a set of providers (e.g., a Virtual Service Provider) 312 is implemented to provide an intelligent sharing point for the device to other partitions. A Virtual Service Provider shares or emulates a physical device to other guest operating systems running in virtual machines, e.g., as represented in FIG. 3, the general purpose operating system 210 and its virtual device drivers (e.g., Virtual Service Consumer) 313 may be loading (as represented by the dashed boxes) while the special purpose operating system 309 is running.

It is generally more desirable for timing-sensitive devices to be held by the first booting specialty partition for the extent of a media play session. Thereafter, if a general purpose operating system is loaded, the media partition may terminate upon media player exit. The specialty partition may release the device and the virtual machine manager may assign the device to the productivity operating system and then generate plug and play events or the like for the general purpose operating system, such that the general purpose operating system discovers the real physical devices, binds physical device drivers to these, and terminates the utilization of the virtualized devices through the Virtual Service Consumer.

Note that alternative models, described below, allow devices to transition between partitions, or even provide a new unique or separate driver service partition, whereby each partition need not have any of its own physical device drivers as represented in FIG. 3.

Figure 5A:
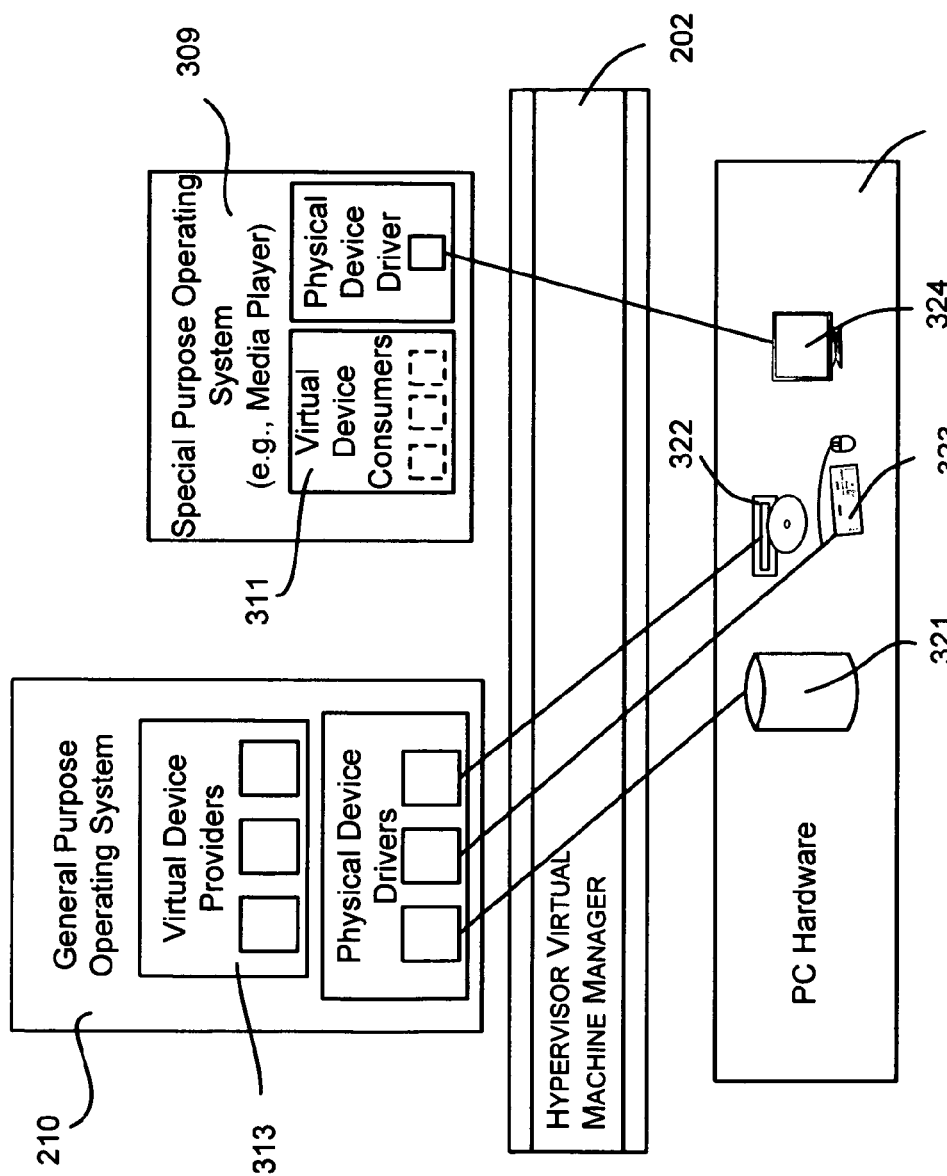
FIG. 5A is a block diagram representing various components with independent device assignments among partitions, with the special purpose operating system transitioning in part to some physical device drivers of a general purpose operating system.

FIG. 5A shows a partial transition to the general purpose operating system 210 once loaded. Note that a DVD player may sequentially stream data to a memory buffer faster than the buffer is emptied during playback. If a buffering system is designed that could be duplicated or shared and utilized by both partitions, transitioning the utilization a device might be possible even during media activities. If the system buffer is created large enough, there may be a long enough quiescent state during which ownership of one or more hardware devices can be transferred. An application in the general purpose operating system may resume filling of the same buffer that the specialty partition playback experience is using. By filling the large playback buffer or a replicant prior to any transition, and handshaking between partitions (e.g., via the virtual machine manager 202 and operating system resident Plug-and-Play events), the transition can be essentially seamless.

However, note that video or graphics devices 324 may be somewhat difficult to transfer seamlessly (i.e., glitch-free from the viewer's perspective), and thus the media partition may own these drivers/hardware for life of the media experience. This is the state represented in FIG. 5A, where the monitor 324 and associated graphics driver are still owned by the media player 309. Similarly, although an audio device and its driver are typically less complex, the ear is much less tolerant than the eye, whereby audio can be even more difficult to transition without glitch. If the user stops the playback, or switches from full screen viewing to windowed viewing in a windowing environment, the transition may be made, since such actions are not be expected to be a glitch-free experience.

To summarize, although device reassignment across partitions is possible and further are not likely completely seamless when dealing with isochronous activities like media playback, such transitions may be perceived as seamless by playing video and/or audio through an extended or extensible memory playback buffer; as device read speeds can exceed playback data requirements, significant read-ahead caching (e.g., on the order of minutes) of video and/or audio to RAM may be achieved. As the general purpose operating system and a complementary designed player application are appropriately loaded, the special purpose operating system may share or transition the large buffer with the general purpose operating system, and then release the media player (e.g., DVD drive) and allow the general purpose operating system to acquire it. If the specialty operating system needs resources, the specialty operating system may provisionally set up a Virtual Service Consumer share back to the general purpose operating system.

Figure 5B:
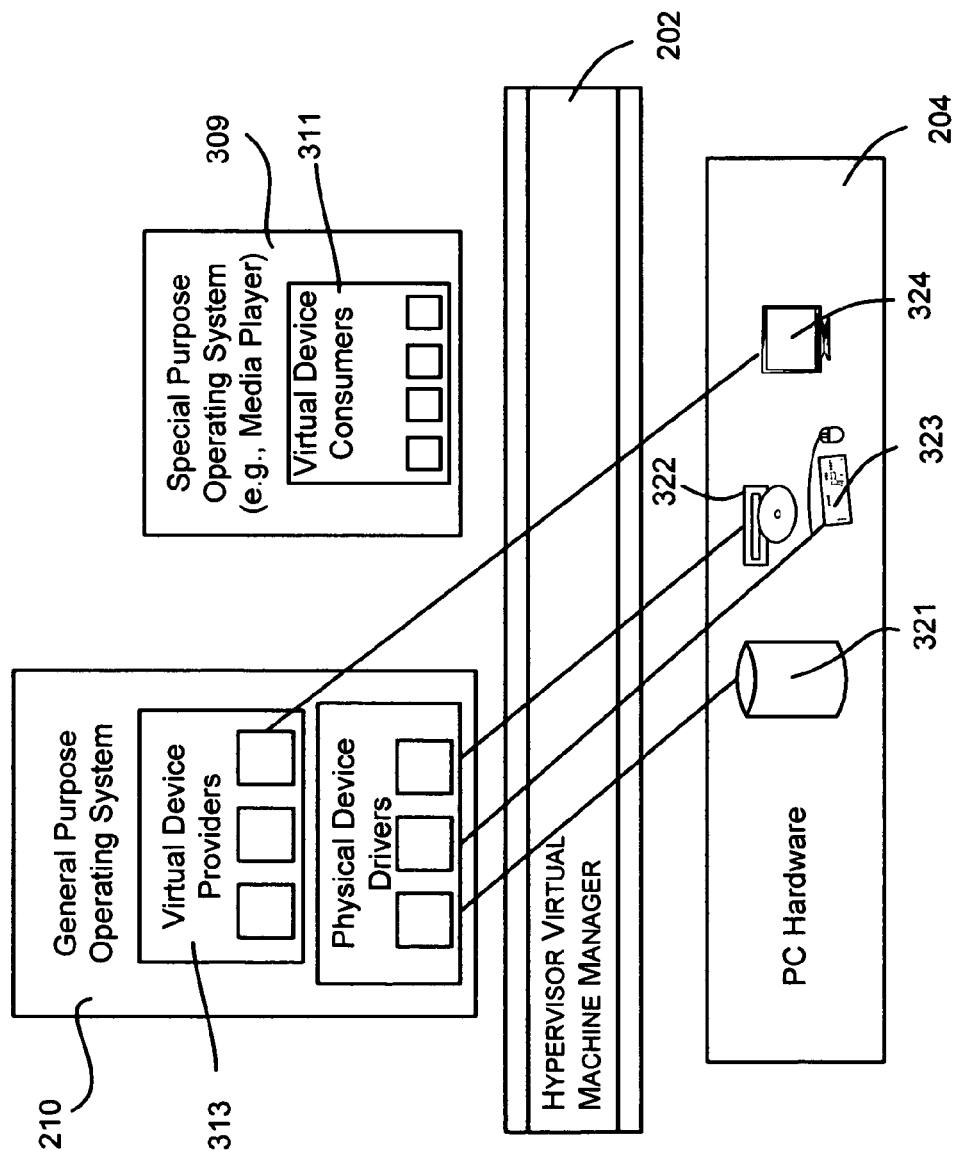
FIG. 5B is a block diagram representing various components having drivers transitioned from a special purpose operating system to drivers of a general purpose operating system.

As represented in FIG. 5B, once the transfer is complete, the system (e.g., the virtual machine manager 202) may terminate the partition 309 and move everything to the general purpose operating system 210. This is because the general purpose operating system 210 has the capabilities to play media as well as do essentially anything another special purposes partition can do. However, as mentioned above with respect to digital rights management and/or isolation for the purpose of protected environments, there may be benefits to keeping one or more partitions active even when the general purpose operating system 210 is fully loaded and running.

For example, one benefit of strong partitioning is the isolation of error conditions and reductions in single points of failure in the whole system. There may be different partitions that can operate rather autonomously for different computing functions or even isolated device drivers, whereby failure of one partition will not bring down the entire computing device. In this manner, for example, a game playing program that crashes its partition, or other general purpose local interactive functionalities (including the general purpose operating system if the game is run in that partition), will not cause another partition such as a telephony or a personal video recorder/player partition or its media extender interface to fail, whereby a scheduled recording will still take place. Such partitioned isolation thus protects the independent functions that a computer system can perform.

Figure 6:
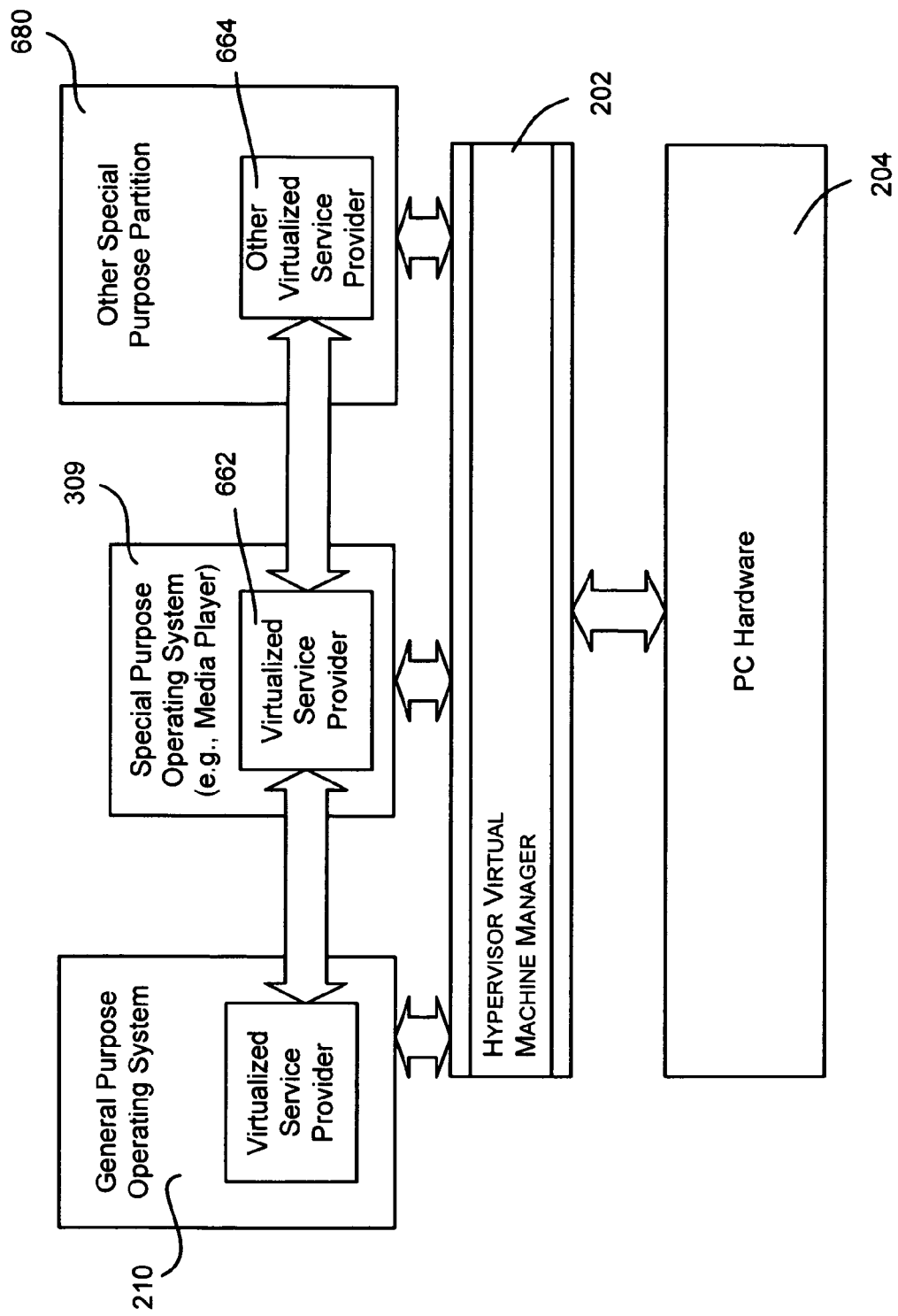
FIGS. 6-8 are a block diagram representing other alternative example architectures for fast booting to a specialized experience.

FIG. 6 shows the concept of a virtual service provider 662 offered by a partition that owns a physical device or resource, with the virtual service provider 662 sharing and working with a companion Virtual Service Consumer and/or clients in other partitions (e.g., 664). The interaction requires an inter-partition messaging and signaling facility, and ideally there may be some shared system memory. The partition that actually owns the device and has the physical device driver will generally be the first partition instantiated, especially if it is involved in an isochronous or timing sensitive activity. This even may be the hypervisor 202. In general, along with device drivers, the virtualized service provider may share resources to another partition when loaded, such as management services, policy, and so forth. As DMA remapping silicon becomes more common, individual or different devices may be more easily owned by different partitions, or device ownership also may more easily transition independently to be owned by another partition. Thus, as multiple partitions end up owning devices, they can also each also shared from those owning partitions by those partitions as depicted by 210, 309 and 680 where providers are found in multiple partitions. The constitution of the virtualized resource providers 662, 664 need not be identical as their devices may be different, and sharing may be asymmetrical.

Figure 7:
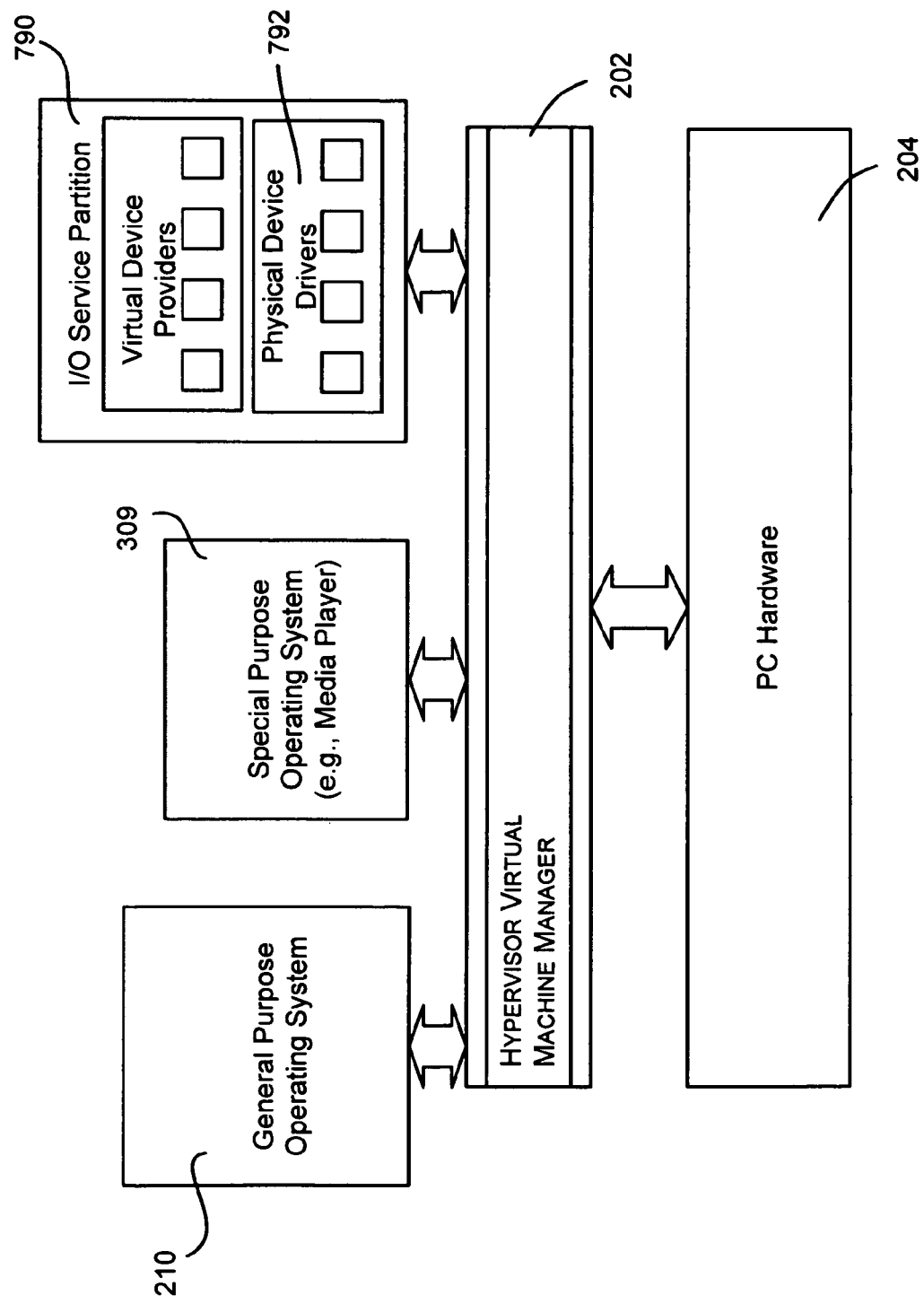

FIG. 7 shows the concept of an input/output (I/O) service partition 790 including device drivers 792 that can be shared for use by other partitions 210 and 309. Although not specifically represented in FIG. 7, there may be multiple service partitions, and some may include device drivers and other related code (e.g., codecs, decryption, policy and other services) for only a subset of the entire hardware 204. In addition to service isolation, in this manner even system availability may be improved. For example any given service partition may fail and still not bring down the entire system or total device I/O. Note that although not shown in FIG. 7, the general purpose operating system 210 (or any other partition) may have its own drivers and the like for enhanced efficiency and even possibly recovery.

Figure 8:
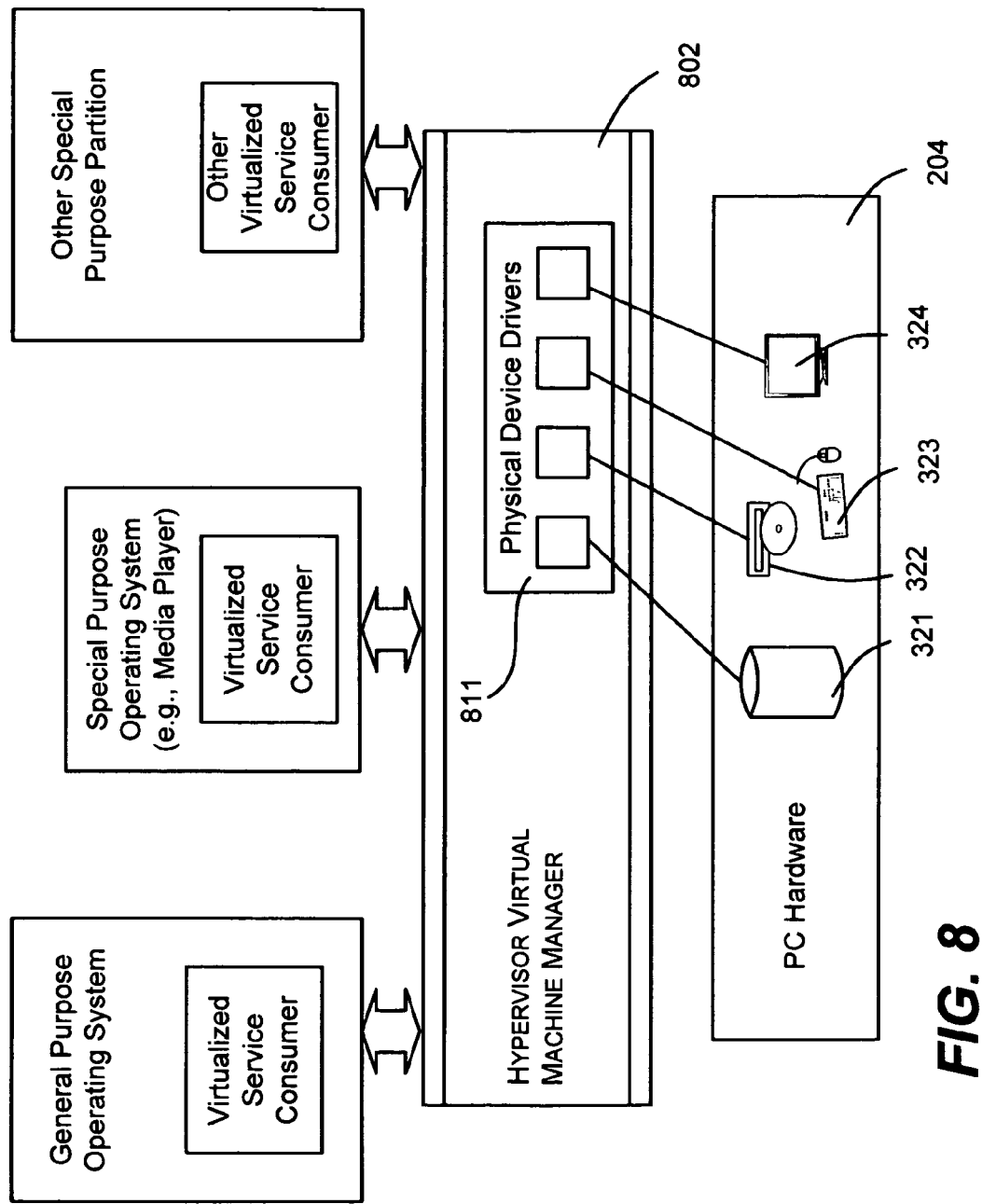

FIG. 8 shows another alternative architecture, in which some (or possibly all) physical devices are owned by a hypervisor 802, which includes the physical device drivers 811. Each guest partition includes a virtualized service consumer.

Most devices accommodate a rather complex set of demands, relative to virtualization, in rationalizing multiple legacy operating systems that contend for a resource, (in which each operating system presumes exclusive ownership). If a device is owned and utilized exclusively, configuration, interrupt servicing, and device I/O can be performed directly by the owning operating system, lessening the requirements on the hypervisor or another sharing virtual machine.

In addition to sharing through a virtualization service provider, virtualization of graphics devices provide advantages, in that graphics cards are often extremely intelligent and highly-programmable devices. This design provides for an intelligent graphic device that can virtualize itself, set up multiple graphic contexts and represent itself as if it were multiple discrete devices, each of which can be individually assigned to each virtual machine. Each virtual machine may then communicate directly with the device, thereby reducing the complexities of intermediary process logic and time-consuming context switches. An intelligent, self-virtualizing and/or multi-headed device may provide asymmetric heads to the partitions, as each virtual machine may have different resource requirements or differential interfaces attributes. The applications also may be different. A specialized operating system and its selective applications may only require some selective interface, e.g., for large data blobs and sequential I/O play, thereby not requiring broader and possibly tedious object granular services that are common in general purpose operating systems. Though many devices may present multiple heads or functions and act rather independently, a graphics card has some other opportunities, if for no other reason that there may be a single user of the partitioned machine. Though multiple operating systems and services may run in partitions, it is not a given that the user would desire redundant and (possibly) confusing views to the system interface. As a result, the GPU may have the additional challenge of reintegration of facilities such as the desktop, start menus, task bars that are otherwise unique to the operating system, and attributes and partitioned concepts for each virtual machine. This visualization example does likely not apply to other devices such as network interface adapters. For complex concurrent operating system scenarios, a common abstracting graphics processor (GPU) may assist in integrating the contexts and improving the user interface, e.g., for things such as a common desktop, when compared to the recursive model common with most virtualization solutions today.

In general, audio devices are not as intelligent as graphics devices and thus do not have the robust facilities by which they may easily virtualize themselves. Audio resources need not be as exclusively allocated as say a storage device. Unique buffers may be offered to each partition where a new type of aware device driver operates under the knowledge that it is working with an expressly shared device. The audio controller may further enjoy less thrashing if it were to poll each guest for output information as opposed to all of the latency due to non-opportunistic interrupts and complexity of decoding interrupts driven I/O. Notwithstanding, multi-threaded operating systems have successfully dealt with the challenges of multiple threads and applications writing to the hardware concurrently; similarly, for a single user, multiple streams may be combined through the audio device to represent aggregated tracks. As one media scenario described herein is primarily a single user solution, multiple operating systems may similarly stream data to the audio output facilities. Although such a concept might seem to garble audio data, this may be acceptable for dub-over like experiences for audio events. For example, a virtual service provider (e.g., of the provider set 312 in FIG. 3) for audio devices may provide one partition with exclusive control of the device configuration interfaces, but the facility can provide each partition with its own hardware direct interface for data output, with the output streams aggregating into the codecs and summating through the speakers.

Note that semiconductor technologies have recently reached some limits that do not allow for the same performance gains through process reduction and frequency increments. Instead, system gains are now also commonly achieved via multi-core and multi-processor designs. Multi-core or multi-processor systems facilitate the concurrent execution of more than one partition, and significantly relieve the overhead of switching processor contexts. For a multi-processor or multi-core system, the hypervisor scheduler may bias the scheduling of virtual machines such that the key components of the consuming and providing partitions are virtually always concurrently resident on one of the cores or processors and minimize their contention for common processor resources as well as reducing latency for the expensive swapping of processor contextual information. The specialty partition and the general operating system partitions are configured to use shared memory for shared virtualized devices through the virtual service provider/consumer model described above, and thus do not require as elaborate or fully replicated multi-headed hardware devices for rich media solutions.

For a device having multiple operating systems, media resources may be additionally shared via a higher-level abstraction (relative to conventional device functionalities). For example, a rich media provider may share functionality with objects and methods, such as a virtual remote control that shares functions such as Play, Fast-Forward, Reverse, Pause and so forth, but not necessarily the granular disk, keyboard and graphics attributes, or require the re-assignment of devices. This is particularly useful for a scenario such as described above when the general purpose operating system needs to take over device control, and the specialty partition may stay resident and maintain the I/O and experience integrity. The specialty partition now may not even need any UI as its reduced capabilities are abstracted through the virtual remote control. The remote media control provider may now support additional instances of media activities from other partitions where play, record and such events may now be driven from an initiating virtual machine, and data retrieval from DVD, hard drives or removable flash media happens from the actual device-owning partition, along with detailed output to video and audio resources. The controlling partition may also open up a shared memory buffer with the consuming partition through which rich media content may directly be streamed into the playback partition. As a result, the special service partition may virtualize a much higher level service like media playback and may not require the virtualization of a low level physical device or be complicated with transitioning devices or risk other glitch prone events.

To summarize, as represented in FIGS. 2-8, there may be literal device drivers in one or more partitioned operating system, which owns its real device drivers outright and program the respective literal devices, there may be a virtualized provider or sharing mechanism, and/or there may be one or more I/O service partitions. A hypervisor may also be implemented where it owns physical devices and even a device driver facility and provider or emulation infrastructure much like an IO service partition. One type of device management operates by terminating (or effectively transitioning) a partition's direct device ownership, and associating the device with a different partition and the appropriate device drivers in the new partitions such as by effecting plug-and-play events to transfer ownership. That partition may be then configured to offer a reflexive sharing provider.

Turning to the concept of a boot sequence, as can be readily understood, the first partition does not need a virtual machine manager 202. Instead the virtual machine manager 202 may be loaded at the time of concurrency need along with the loading the general purpose operating system, for example. However, to assist in the transition, since late binding of a virtual machine manager below an existing partition may be complex, the specialty partition may anticipate a concurrent general purpose operating system and associate with a virtual machine manager, which may be on disk or non-volatile memory, such that the boot occurs with this thin virtual machine manager working. For late binding, the virtual machine manager may describe or construct a partition that describes the pre-existing OS and then subjugate or hoist it onto the virtual machine manager. The hypervisor also may be loaded first or part of an OS-virtual machine manager image. It may be essentially part of a firmware image.

Note that with such a small amount of memory, there may be high availability, recovery and a speed advantage to having a virtual machine manager and/or special purpose operating system image boot from non-volatile memory, versus a partitioned on the hard disk. For example, if present in flash memory (e.g., on the motherboard, device, hard disk drive, or other areas of the machine), the image of the specific virtual machine experience may further decrease boot time, power consumption and improve user experience.

FIGS. 2-8 thus illustrate how using a virtual machine manager provides creation of an implementation that allows a virtual machine manager and specialty purpose operating system to instantiate a limited experience, without the overhead of loading the entire general purpose operating system. Once a virtual machine manager is spawned, additional special purpose operating systems may run (e.g., a DVD player that starts playing a movie) as well as the general purpose operating system, which may subsequently fully load in the background during the first user-requested activity, masking the boot time delay. Once the general purpose operating system is fully loaded, responsibility for the special purpose operating system experience may handed-off to the general purpose operating system, or alternatively, the special purpose operating system may coexist until not needed, and terminated at that time, if at all.

In this manner, booting more quickly to a special purpose, appliance-like operating system rapidly provides specific user experiences, via a virtual machine manager. This benefit can coexist with the other values that a general purpose operating system offers, and provides the ability to defer booting directly to a full general purpose operating system. Instead, the full general purpose operating system may boot/load in its own virtual machine after the specific virtual machine experience may already be well under way. The special purpose operating system may share resources with other virtual machines, as well as transition to the general purpose operating system when loaded, although the special purpose experience may instead coexist with the general purpose operating system.

Coexistence via the functionality and structure described herein allows additional new dynamic experiences to operate along with the general purpose operating system. For example, the virtual machine manager allows the interaction between services operating in each partition, whereby, as a further example, a general purpose operating system-based application may control pause, play and fast-forward of a DVD running on a special purpose operating system. Such a hand-off of functionality from a specific virtual machine experience to a full general purpose operating system (once loaded) provide a rich experience and may improve content protection as well. Termination of the special purpose environment may be performed, if desired.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computing device comprising:
    at least one boot device that comprises memory that comprises a special-purpose operating system and a general purpose operating system;
    additional memory that includes computer-executable instructions that, based on execution by the computing device, configure the computing device to:
        boot the special-purpose operating system in a first partition in response to starting the computing device based on a first hardware event;
        initially execute, via the booted special-purpose operating system, an application that is associated with the first hardware event;
        process, by the application being initially executed by the booted special-purpose operating system, media that is protected by the first partition;
        further boot, during operation of the special-purpose operating system, the general-purpose operating system in a second partition that is isolated from the first partition and that comprises a file system; and
        hand-off control of the execution of the initially executing application from the booted special-purpose operating system via a user-perceived seamless transition to the booted general-purpose operating system, where the application continues processing the media protected by the first partition under the handed-off control of the booted general-purpose operating system via control interfaces to the first partition, and where the media protected by the first partition is isolated from the file system in the second partition.

2. The computing device of claim 1 where the first hardware event is selected from the group consisting of: activation of a media control button, use of a special media-player button, and a media insertion hardware event.

3. The computing device of claim 1 where the first hardware event comprises activation of a specific button dedicated to booting the special purpose operating system, the first hardware event causing a first value to be stored in a basic input-output system ("BIOS"); and
    the boot loader configured to determine, based at least in part on whether the first value is stored in the BIOS, whether to load the special-purpose operating system or the general purpose operating system.

4. The computing device of claim 1 where the special-purpose operating system is configured to increase power savings by activating only a subset of available hardware resources.

5. The computing device of claim 1 configured for the special-purpose operating system and the general-purpose operating system to both run concurrently on the computing device.

6. The computing device of claim 1 where the special-purpose operating system is dedicated to playing media.

7. A method performed on a computing device, the method comprising:
    booting a special-purpose operating system in a first partition in response to starting the computing device based on a first hardware event;
    initially executing, via the booted special-purpose operating system, an application that is associated with the first hardware event;
    processing, by the application being initially executed by the booted special-purpose operating system, media that is protected by the first partition;
    further hooting, during operation of the special-purpose operating system, a general-purpose operating system in a second partition that is isolated from the first partition and that comprises a file system; and
    handing-off control of the execution of the initially executing application from the booted special-purpose operating system via a user-perceived seamless transition to the booted general-purpose operating system, where the application continues processing the media protected by the first partition under the handed-off control of the booted general-purpose operating system via control interfaces to the first partition, and where the media protected by the first partition is isolated from the file system in the second partition.

8. The method of claim 7 where the first hardware event comprises activation of a media control button, use of a special media-player button, or a media insertion hardware event.

9. The method of claim 7 further comprising:
storing, in response to the first hardware event, a first value in a basic input-output system ("BIOS"); and
determining, based at least in part on whether the first value is stored in the BIOS, whether to load the special-purpose operating system or the general purpose operating system.

10. The method of claim 7 where the special-purpose operating system increases power savings by activating only a subset of available hardware resources.

11. The method of claim 7 further comprising running the special-purpose operating system and the general-purpose operating system concurrently on the computing device.

12. The method of claim 7 where the special-purpose operating system is dedicated to playing media via the application.

13. At least one computer-readable hardware storage device that includes computer-executable instructions that, based on execution by a computing device, configure the computing device to perform actions comprising;
booting a special-purpose operating system in a first partition in response to starting the computing device based on a first hardware event;
initially executing, via the booted special-purpose operating system, an application that is associated with the first hardware event;
processing, by the application being initially executed by the booted special-purpose operating system, media that is protected by the first partition;
further booting, during operation of the special-purpose operating system, a general-purpose operating system in a second partition that is isolated from the first partition and that comprises a file system; and
handing-off control of the execution of the initially executing application from the booted special-purpose operating system via a user-perceived seamless transition to the booted general-purpose operating system, where the application continues processing the media protected by the first partition under the handed-off control of the booted general-purpose operating system via control interfaces to the first partition, and where the media protected by the first partition is isolated from the file system in the second partition.

14. The at least one computer-readable hardware storage device of claim 13 where the first hardware event comprises activation of a media control button, use of a special media-player button, or a media insertion hardware event.

15. The at least one computer-readable hardware storage device of claim 13 where the special-purpose operating system increases power savings by activating only a subset of available hardware resources.

16. The at least one computer-readable hardware storage device of claim 13, the actions further comprising running the special-purpose operating system and the general-purpose operating system concurrently on the computing device.

17. The at least one computer-readable hardware storage device of claim 13 where the special-purpose operating system is dedicated to playing media.

* * * * *